(12) United States Patent
Ilan et al.

(10) Patent No.: US 7,113,857 B2
(45) Date of Patent: *Sep. 26, 2006

(54) HANDWRITTEN AND VOICE CONTROL OF VEHICLE COMPONENTS

(75) Inventors: Gabriel Ilan, Tel Aviv (IL); Benjamin Dov Giloh, Misgav (IL); Arie Kadosh, Naharia (IL)

(73) Assignee: Nuance Communications Israel Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 11/295,495

(22) Filed: Dec. 7, 2005

(65) Prior Publication Data

US 2006/0085115 A1    Apr. 20, 2006

Related U.S. Application Data

(63) Continuation of application No. 09/674,710, filed as application No. PCT/IL99/00238 on May 6, 1999.

(60) Provisional application No. 60/084,520, filed on May 7, 1998.

(51) Int. Cl.
    *G06F 7/00*    (2006.01)

(52) U.S. Cl. .......................................... 701/49; 701/36
(58) Field of Classification Search .................. 701/36, 701/45, 49; 704/275, 200, 246; 307/9.1; 715/728

See application file for complete search history.

(56) References Cited

U.S. PATENT DOCUMENTS 4,506,377 A * 3/1985 Kishi et al. .................. 704/275

FOREIGN PATENT DOCUMENTS

| KR | 10-1995-0024564 | 3/1997 |
|----|-----------------|--------|
| KR | 10-1993-031606  | 4/1998 |

* cited by examiner

*Primary Examiner*—Yonel Beaulieu
(74) *Attorney, Agent, or Firm*—AlphaPatent Associates Ltd.; Daniel J. Swirsky

(57) ABSTRACT

A recognition system for use in a vehicle or the like includes a handwriting recognizer and a voice recognizer for receiving handwriting and voice signals and a control unit to communicate a command signal associated with one, the other or a combination of both of the voice and handwritten inputs to at least one appliance. Such appliances may include, but are not limited to, car alarms, electronic windows, personal computers, navigation systems, and audio and telecommunications equipment.

24 Claims, 3 Drawing Sheets

HANDWRITTEN AND VOICE CONTROL OF VEHICLE COMPONENTS

CROSS-REFERENCE TO RELATED APPLICATIONS

This application is a continuation of U.S. patent application Ser. No. 09/674,710, filed Jan. 29, 2001, which is a U.S. National Phase Patent Application under 35 USC 371 of PCT Patent Application No. PCT/IL99/00238, filed May 6, 1999 which claims benefit of U.S. Provisional Patent Application No. 60/084,520, filed May 7, 1998, all of which are hereby incorporated by reference.

FIELD OF THE INVENTION

The present invention relates to handwriting and voice recognition systems in general, and more particularly to handwriting and voice recognition systems for use in a vehicle.

BACKGROUND OF THE INVENTION

Voice recognition systems have been utilized in a variety of applications to command electronic devices. Recent attempts have been made to employ such voice recognition systems to allow drivers to control automobile appliances, such as vehicle-based cellular telephones or electrical windows. Such applications make it possible for drivers to keep their eyes on the road instead of on the appliances while driving, thereby enabling drivers to drive more safely. However, such systems are adversely affected by the ambient noise present in environments such as the interior of a vehicle, particularly when the windows are open while driving at high speeds. Thus, the need exists for vehicle appliance control that allows a driver to keep his eyes on the road while not being affected by ambient vehicle noise.

SUMMARY OF THE PRESENT INVENTION

It is an object of the present invention that a driver may operate automobile appliances safely while driving.

A system is provided that includes a voice recognition unit to receive a voice input, a handwriting recognition unit to receive a handwritten input and a control unit to receive and to communicate one, the other or a combination of both of the voice and handwritten inputs to at least one appliance within the vehicle.

Moreover, in accordance with a preferred embodiment of the present invention, at least one command data set includes alphanumeric characters or symbolic characters. Alternatively, the at least one command data includes cellular telephone and alphanumeric characters.

Further, in accordance with a preferred embodiment of the present invention, at least one appliance is a personal computer and at least one command data set includes computer instructions and alphanumeric characters.

Still further, in accordance with a preferred embodiment of the present invention, at least one command data set is associated with a predetermined set of voice signals, a predetermined set of handwritten signals or a predetermined set of handwritten and voice signals.

Further, in accordance with a preferred embodiment of the present invention, at least one command data set is associated by a user with at least one voice signal.

Further, in accordance with a preferred embodiment of the present invention, at least one command data set is associated by a user with at least one hand signal.

Further, in accordance with a preferred embodiment of the present invention, at least one command data set is associated with handwritten and voice signals modifiable by the user.

Moreover, in accordance with a preferred embodiment of the present invention, one appliance is a car alarm.

Moreover, in accordance with a preferred embodiment of the present invention, it connects to at least one appliance by an interface appropriate to the appliance.

Further, in accordance with a preferred embodiment of the present invention, at least one appliance is a cellular telephone and at least one command data set includes short text messages.

Still further, in accordance with a preferred embodiment of the present invention, at least one appliance is a personal computer and at least one command data set includes short text messages.

Further, in accordance with a preferred embodiment of the present invention, at least one appliance is a radio.

Further, in accordance with a preferred embodiment of the present invention, at least one appliance is a navigation system and at least one command data set includes locations.

Even further, in accordance with a preferred embodiment of the present invention, it also comprises of a microphone operatively connected to the voice recognition unit.

Even further, in accordance with a preferred embodiment of the present invention, it also comprises of a touchpad operatively connected to the handwriting recognition unit.

Even further, in accordance with a preferred embodiment of the present invention, it also comprises of a unit to compare at least one first command and at least one second command.

Even further, in accordance with a preferred embodiment of the present invention, it also comprises of a unit to combine the first command and the second command.

Even further, in accordance with a preferred embodiment of the present invention, at least one command data set is associated by a user with at least one 3 dimensional hand gesture.

Finally, in accordance with a preferred embodiment of the present invention, at least one appliance is a sunroof or a window.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
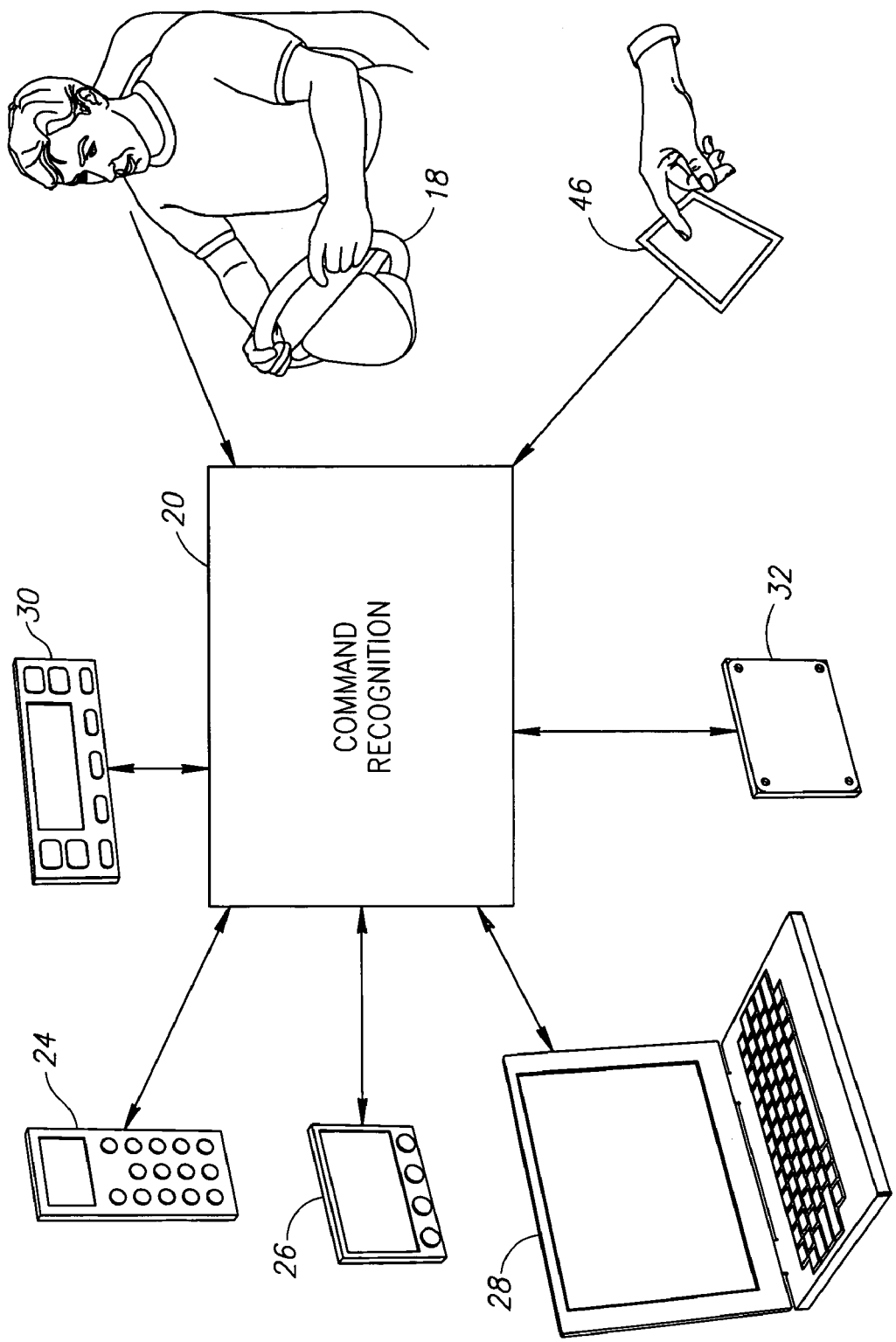
FIGS. 1 and 2 are functional block diagrams of a voice and handwriting recognition system constructed and operative in accordance with a preferred embodiment of the present invention.

With reference to the drawings for purposes of illustration, the present invention is embodied in a command recognition device 20 (FIG. 1) that enables the operation of electronic appliances in a vehicle or the like, represented conceptually by a steering wheel 18, by using handwritten commands through the use of handwriting recognition technology known in the art. Known voice recognition technology may additionally be combined with handwriting recognition technology to provide a reliable and robust method of interacting with such electronic appliances, systems or devices. Electronic appliances may include, but are not limited to, a cellular telephone 24, a Global Positioning System (GPS) navigation system 26, a personal computer (PC) 28, a radio 30, an alarm system 32, electric windows (not shown), a sunroof (not shown), and the like.

Figure 2:
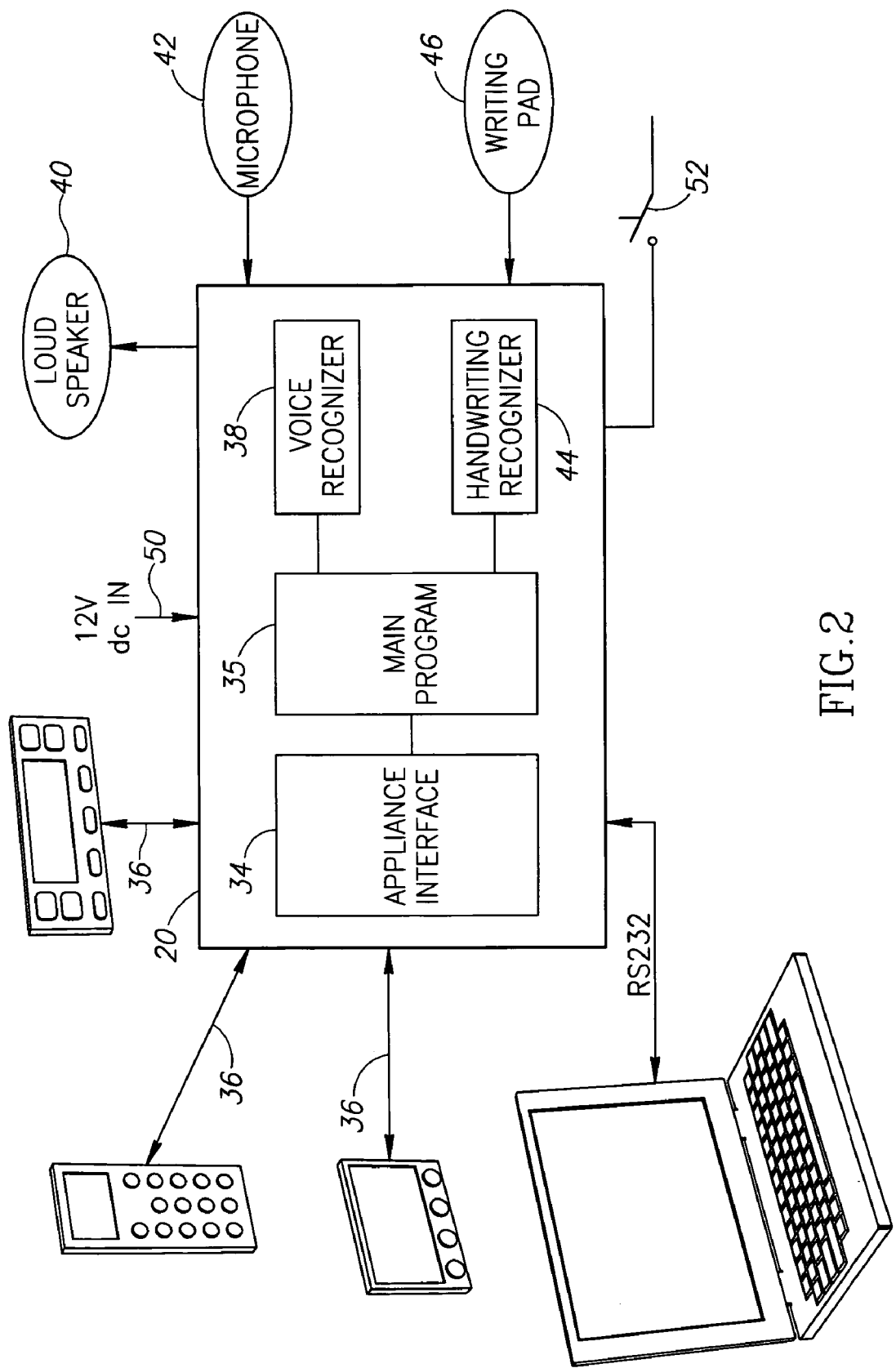

With reference to FIG. 2, appliances connect to the device 20 through an appliance interface 34. The appliance interface 34 is preferably adapted for use with one or more appliances or types of appliances and may be adapted to conform with appliance hardware standards and\or software protocols for remote operation thereof. The interface module 34, implemented in hardware and/or software, is the physical module with which appliances connect via electrical connectors 36. Interface 34 is controlled by a main program module 35 which selects the commands to be sent to each appliance. Interface module 34 also produces the correct voltage and current needed to communicate with the appliances. For example, if the user wishes to communicate with a PC via the RS232 protocol, then translation of digital commands produced by the main program module 35 into actual +/−12 volt pulses (as required by the RS232 protocol) will be performed by the interface module 34. Command sets corresponding to each of the appliances are maintained by the main program module 35. An example of such interface adaptability is found in conventional universal remote control devices for use with entertainment systems where the remote control device may be trained by the user to cooperate with appliances and/or includes a library of known appliances and specific commands corresponding to such appliances. In the latter instance the user selects the library of commands that corresponds to the appliances. The connection leads 36 between the appliance and the interface may vary and include, but are not limited to, wire, infrared, serial, or bus connections. In an alternative embodiment, the appliances may be assembled with the interface module 34 and may include any number of conventional interface configurations.

Device 20 preferably includes a voice recognizer 38 connected to a microphone 42 and a handwriting recognizer 44 connected to writing pad 46. Command recognition as used herein refers to handwritten or spoken command signals being recognized by a handwriting or voice recognizer engine and then matched with preprogrammed commands contained in a command data set which are associated with the command signal.

The voice recognizer 38 receives voice commands through the microphone 42 and searches for a matching voice command within a known list of voice commands tailored for the appliances to which device 20 is connected. The microphone may be placed in a vehicle console, sun visor, or in any location suitable for the convenient reception of voice commands from the driver or other passengers. Voice commands may also be input via an external microphone, such as via a cellular phone, or otherwise into the voice recognizer such as is described in assignee's copending U.S. patent application Ser. No. 09/002,616, the disclosure of which is incorporated herein by reference. It will be appreciated that such voice commands may be trained by the user and/or provided in a pre-trained library of appliance brand specific commands.

The handwriting recognizer 44 receives symbols provided by the user through handwriting pad 46. The handwriting pad 46 is preferably located in a position convenient for the driver such as on the steering wheel or on the gearshift. Alternatively, handwriting commands may be input via an external touchpad, such as a laptop's touchpad connected to device 20. A handwriting recognizer of the type suitable for this purpose is disclosed in U.S. Pat. Nos. 5,659,633, 5,774,582, 6,023,529 and 5,982,929 and U.S. patent application Ser. Nos. 08/282,187 and 08/878,741, the disclosures of which are incorporated herein by reference. It will be appreciated that handwritten symbols corresponding to appliance commands may be trained by the user and/or provided in a pre-trained library of application specific commands.

It will be appreciated by those skilled in the art that the command libraries for the command recognition module may include a standard set of commands adapted for use with appliances such as cellular phones or personal computers, such as commands relating to voice dialing, number dialing, getting e-mail, operating an alarm system, and the like.

Main program module 35 provides an interface to control the transfer and distribution of commands between the appliance interface 34 and the recognition modules 38 and 44. The device 20 preferably draws power from the car's voltage 50 through a direct connection, being connected to the lighter outlet or directly to the car battery. Device 20 may alternatively operate independently on DC batteries.

A switch 52 is included to permit switching of the device between an operational mode and a set-up/training mode. A function of the main program module 35 is to combine and coordinate the recognition modules 38 and 44 in order to produce the proper command to the chosen appliance. The first command after entering the recognition or operation mode should be related to identifying the appliance which the user wishes to control. Alternatively, a default appliance or the last appliance used before system shutdown may be used. Following appliance selection, the main program module 35 will switch to the chosen appliance, sending commands recognized by the voice recognizer 38 and/or the handwriting recognizer 44 to that specific appliance. It is the role of the main program module 35 to associate the recognized command given by the user and the proper appliance command for the appliance selected.

The voice and handwriting recognizers 38 and 44 search for a matching voice or handwriting command in a library of commands. There are preferably separate libraries for every appliance. Once an appliance is selected, the main program module 35 instructs the recognizers to load the proper command libraries, typically one for voice and one for handwriting. Alternatively, some libraries are loaded and the recognizers are notified which libraries should be used during the search for a matching command. Subsequently, upon receiving an input signal, the recognizers send an identifier of the appliance command that was recognized to the main program module 35. Given this identifier and the appliance that has been selected, the main module will interpret the command and send it to the selected appliance via the appliance interface 34. To enable global commands, such as pick up the cellular phone, there are also voice/handwriting signals that will be recognizable no matter what appliance has been currently selected. Representations of these signals will be loaded in every library for use by the recognizers, or in a global library, and will have unique identifiers that will not be used by any other appliance so that the main program module 35 will always be able to interpret them. Furthermore, a "double validation mode" is provided where the main program module 35 validates that both recognizers returned identifiers corresponding to the same command, otherwise the command will be rejected. In order to increase the effectiveness of the system in the presence of noise, a tolerance level may be set. For example, the voice recognizer 38 could return the identifiers of several best matches instead of just one identifier. Should one of the identifiers correspond to an identifier returned from the handwriting recognizer 44, this may be deemed an acceptable validation. Additionally, a "conforming mode" is also provided in order to allow two commands to be entered simultaneously. For example, when the user says "radio" and writes "5" the device will turn on the radio and select station 5 immediately. Furthermore, a "user verification/ authentication mode" is provided based on a combination of the user's voice and handwriting characteristics rather than the known user verification modes that operate on these characteristics separately. The user may receive feedback from device 20 through loudspeaker 40 indicating the recognized command was received and sent to the appliance.

It is appreciated that the same handwriting gesture or spoken command may have a different meaning when being interpreted by the main program module 35 depending on the appliance selected. For example, the spoken word "up" might mean "close window" if "electric windows" have been selected, but it might also mean "increase the volume" when operating the radio. It is further appreciated that a handwriting gesture or spoken command may operate more than one appliance at a time, thus providing a "macro" capability where one spoken\handwritten gesture is associated with a series of commands. For example, a user might say "Jill's settings," whereupon device 20 adjusts the seats, mirrors, and steering wheel, and turns on the radio and tunes in Jill's favorite station.

The appliance interface 34, command recognition modules 38 and 44, and main program module 35 may operate on any conventional hardware platform having a CPU and memory adequate to carry out the recognition functions in real time and capable of storing the command libraries. Programming logic may be stored in any type of non-volatile memory, for example, on memory chips such as flash memory or EPROMs. Optionally, command libraries may be included on removable memory modules (not shown) allowing for user training to occur on a conventional PC or to provide appliance specific libraries tailored to specialized needs. The libraries may also be loaded from a PC to device 20 using communication protocols such as RS232. A CPU and memory configuration of the type for this purpose includes the H8/3040 microcontroller, commercially available from Hitachi, and AMD29F800 Flash memory, commercially available from Advanced Micro Devices.

In a preferred embodiment, the device 20 has two major operation modes, namely, recognition and training modes. Switching between operation mode and training mode is controlled by the switch 52. The method for switching between modes using the switch may vary. For example, if the user wishes to enter recognition mode, he may press the switch once to enter operation mode, enabling device 20 to accept spoken or written commands. If the user wishes to train the device 20 for a new command, he may rapidly press the switch twice so that the main program may switch to training mode. Other global commands may be associated with the switch such as for ending a conversation via cellular phone or for closing an application window on the computer.

Operation

Device 20 in operation mode receives voice commands through a microphone 42. The microphone 42 receives the human voice and transforms it into an electrical signal. This signal is then amplified and digitized by the voice recognizer 38. After digitization, the voice recognizer 38 utilizes processing software in order to process the voice signal and perform recognition by searching for a matching voice command in a library which resides in memory. Following association of the voice signal with a command from the library, the voice recognizer 38 sends the command identifier to the main program software module 35 which then interprets it according to the current input state of device 20 (e.g., appliance has been selected, waiting for appliance command input) and sends the command sequence to the proper appliance(s). The speaker 40 may be used by the recognition modules 38 and 44 or by the main program module 35 to optionally convert the command signal into a computer generated voice signal or other playback signal to provide the user with feedback as an indication that the voice signal was received and properly understood.

Handwritten commands are received through writing pad 46, such as a touchpad, that when touched at a certain point transmits the touch point's X and Y coordinates. In the case of a touchpad, the input may be provided with a finger. The handwriting recognizer 44 receives the character, gesture, or word written on the touchpad and searches for a handwriting command match in a library of pre-trained characters, gestures, and words. Once the handwriting recognizer 44 has found a match, it signals the main program module 35. Preferably, the handwriting recognition library includes pre-trained alphanumeric characters, gestures, and symbols so the user does not have to train the recognizer to recognize them. However, the user may have the option of generating symbols convenient to the user for association with appliance commands.

Training Mode

Training each recognizer 38 and 44 means associating a spoken command or a written symbol\gesture\word\character with a command or command sequence that is understood by at least one of the appliances by programming such a relationship into the device 20. For example, the gesture "arrow up" could mean "close the window," or the uttering a name could activate the cellular phone to dial that person's telephone number. The communication protocols of the appliances used in the present invention are typically pre-programmed with device 20. Where a personal computer or other easily adaptable computing device is used, software within the PC may be provided to communicate with the present invention. In such instances the number of possible commands depend upon the type of software and operations used by the user. In order to associate a command with an operation, the user might program the commands as part of the training process. Where operating appliances such as an alarm or a window, device 20 must possess the actual signals that operates those appliances.

Appliance Examples

A typical example of the operation of the present invention may be seen with respect to a radio in which the command set library for the radio was pre-trained into device 20 or entered by the user during training mode. After selecting recognition mode, the user says the word "radio". The main program module 35 now routes all the recognized commands to the radio. The user then writes or says the number "5." The main program then translates the recognized "5" to a digital command understood by the radio as "jump to station number 5" and sends it via interface 34 to the radio. Feedback may be provided for every operation performed by the user. For example, when the user says "radio" the loudspeaker says "radio is activated" using TTS technology. When the user writes "5" the loudspeaker says "station 5 selected" and optionally the name of the station, if available.

Figure 3:
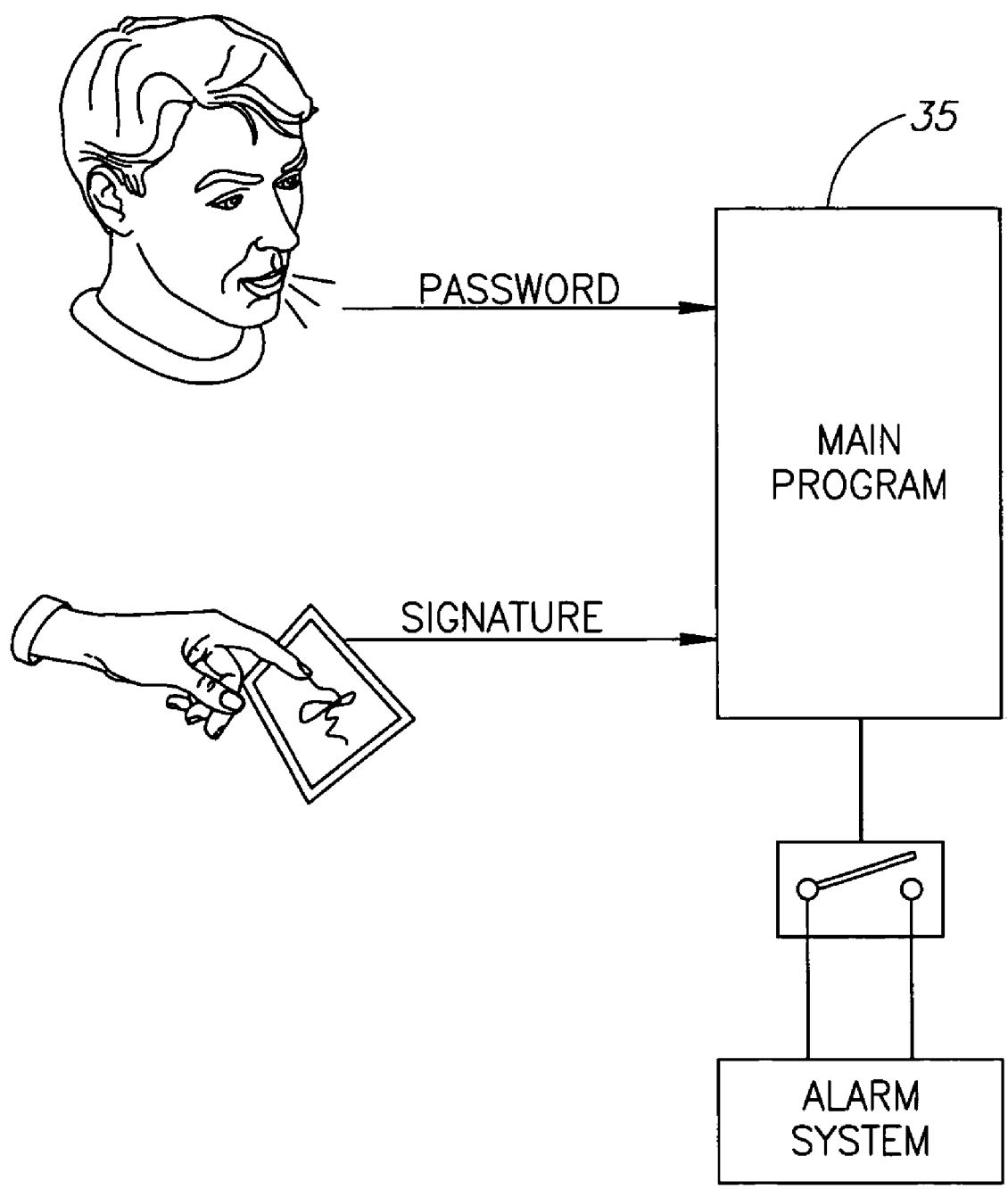
FIG. 3 is a functional block diagram of a dual validation mode voice and handwriting recognition system constructed and operative in accordance with a preferred embodiment of the present invention.

When activating or deactivating a vehicle alarm system, the user may train device 20 to learn both spoken and handwritten passwords, signatures, and other user-specific signal characteristics as can be seen with additional reference to FIG. 3. Only after recognizing both passwords will the main program module 35 send a command to activate or deactivate the alarm system. Another related application provides for appliances such as the seat and mirrors to be adjusted according to the user identification using personalized command and settings libraries, thus accommodating any one of several drivers of the same car.

When operating a car navigation system, the user may navigate the system's menus by voice and then enter names of streets by writing them on the touchpad.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. An apparatus for controlling at least one appliance within a vehicle, the apparatus comprising:
   a voice recognition unit to receive a voice input and to associate said voice input with at least one first command from at least one command data set;
   a handwriting recognition unit to receive a handwritten input and to associate said handwritten input with at least one second command from said at least one command data set; and
   a control unit connected to both said recognition units and capable of receiving said at least one first command and said at least one second command and of communicating a command signal to said at least one appliance, said command signal being associated with a combination of said at least one first command and said at least one second command when both said at least one first command and said at least one second command are received, with said at least one first command when only said at least one first command is received and with said at least one second command when only said at least one second command is received.

2. The apparatus of claim 1 wherein said at least one command data set includes alphanumeric characters.

3. The apparatus of claim 1 wherein said at least one command data set includes symbolic characters.

4. The apparatus of claim 1 wherein said at least one appliance is a cellular telephone and said at least one command data set includes cellular telephone and alphanumeric characters.

5. The apparatus of claim 1 wherein said at least one appliance is a personal computer and said at least one command data set includes computer instructions and alphanumeric characters.

6. The apparatus of claim 1 wherein said at least one command data set is associated with a predetermined set of voice signals.

7. The apparatus of claim 1 wherein said at least one command data set is associated with a predetermined set of handwritten signals.

8. The apparatus of claim 1 wherein said at least one command data set is associated with a predetermined set of handwritten and voice signals.

9. The apparatus of claim 1 wherein said at least one command data set is associated by a user with at least one voice signal.

10. The apparatus of claim 1 wherein said at least one command data set is associated by a user with at least one hand signal.

11. The apparatus of claim 1 wherein said at least one command data set is associated with handwritten and voice signals modifiable by said user.

12. The apparatus of claim 1 wherein said at least one appliance is a car alarm.

13. The apparatus of claim 1 wherein said apparatus connects to said at least one appliance by an interface appropriate to said at least one appliance.

14. The apparatus of claim 1 wherein said at least one appliance is a cellular telephone and said at least one command data set includes short text messages.

15. The apparatus of claim 1 wherein said at least one appliance is a personal computer and said at least one command data set includes short text messages.

16. The apparatus of claim 1 wherein said at least one appliance is a radio.

17. The apparatus of claim 1 wherein said at least one appliance is a navigation system and said at least one command data set includes locations.

18. An apparatus according to claim 1 further comprising a microphone operatively connected to said voice recognition unit.

19. An apparatus according to claim 1 further comprising a touchpad operatively connected to said handwriting recognition unit.

20. The apparatus of claim 1 wherein said control unit comprises a unit to compare said at least one first command and said at least one second command.

21. The apparatus of claim 1 wherein said control unit comprises a unit to combine said at least one first command and said at least one second command.

22. The apparatus of claim 1 wherein said at least one command data set is associated by a user with at least one 3 dimensional hand gesture.

23. The apparatus of claim 1 wherein said at least one appliance is a sunroof.

24. The apparatus of claim 1 wherein said at least one appliance is a window.

* * * * *